United States Patent
Collins

(10) Patent No.: US 6,326,604 B1
(45) Date of Patent: Dec. 4, 2001

(54) OPTICAL INTENSIFICATION SYSTEM, INCLUDING AN IMAGE INTENSIFIER, FOR VIEWING AN INPUT SOURCE THROUGH A LENS AS A VIRTUAL IMAGE OR AS A REAL IMAGE

(76) Inventor: William J. Collins, 5614 E. Weaver Pl., Englewood, CO (US) 80111

( * ) Notice: Subject to any disclaimer, the term of this patent is extended or adjusted under 35 U.S.C. 154(b) by 0 days.

(21) Appl. No.: 09/209,378

(22) Filed: Dec. 10, 1998

Related U.S. Application Data

(60) Provisional application No. 60/069,181, filed on Dec. 11, 1997.

(51) Int. Cl.$^7$ ...................................................... H01J 40/14
(52) U.S. Cl. ..................................... 250/214 VT; 359/399
(58) Field of Search ........................... 250/214 VT, 239; 359/399, 407, 409, 808, 819, 679, 643, 644, 645, 646

(56) References Cited

U.S. PATENT DOCUMENTS

| | | | |
|---|---|---|---|
| 5,268,612 | * 12/1993 | Aebi et al. | 313/103 CM |
| 5,790,313 | * 8/1998 | Kanai | 359/645 |
| 5,898,519 | * 4/1999 | Palmer | 359/399 |
| 6,113,533 | * 9/2000 | Howes et al. | 600/112 |

FOREIGN PATENT DOCUMENTS

WO85/04758-A1 * 10/1985 (WO) ............................ 250/214 VT

* cited by examiner

*Primary Examiner*—John R. Lee
*Assistant Examiner*—Kevin Pyo
(74) *Attorney, Agent, or Firm*—Dorsey & Whitney LLP

(57) ABSTRACT

An optical intensification system for viewing an input source through a telescope or camera lens or other input optical device. The system includes a housing having an input thread coupling adapted to be coupled to the input optical device, an image intensifier positioned within the housing for amplifying the input source, and a lens coupled to an output thread coupling of the housing for providing a virtual image of the input source viewable by the human eye. The image intensifier can provide luminous gain on the order of 20,000 to at least 35,000. In an alternate arrangement, the lens can be coupled to the output thread coupling of the housing using an adapter having one end adapted to be coupled to the housing, and another end adapted to be coupled to an image capturing device, such as a CCD video camera, CCD camera, film camera, digital camera, or other image capturing device. The invention permits viewing the input source, optically intensified through the intensifier, as a virtual image through the lens using the human eye, or as a real image through the lens viewable through an image capturing device, depending on whether the lens is attached directly to the image intensifier or is attached to the image intensifier through the adapter.

5 Claims, 5 Drawing Sheets

OPTICAL INTENSIFICATION SYSTEM, INCLUDING AN IMAGE INTENSIFIER, FOR VIEWING AN INPUT SOURCE THROUGH A LENS AS A VIRTUAL IMAGE OR AS A REAL IMAGE

This application claims priority from U.S. provisional patent application Ser. No. 60/069,181, filed on Dec. 11, 1997, by William J. Collins, entitled "Image Amplification Device", the contents of which are incorporated herein by reference in their entirety.

BACKGROUND OF THE INVENTION

1. Field of the Invention

This invention relates in general to optical devices, and more particularly to image amplification systems for astronomy applications.

2. Relevant Background

Telescopes are conventionally used for amplifying images of astronomical objects having very low inherent brightness. In conventional telescopes, there is generally no light amplification provided beyond standard optical physics. As a consequence, images of objects having inherently low brightness are typically difficult to observe by the human eye with the aid of the telescope. Further, images of these objects require long exposure times if they are to be photographed or captured on a charge coupled device (CCD) video camera or other imaging device.

It is with the shortcomings of the prior art the present invention was developed. What is needed is an optical device capable of providing real time amplification of images having inherently low brightness characteristics.

SUMMARY OF THE INVENTION

In light of the above, therefore, and according to a broad aspect of the invention, disclosed herein is an optical intensification system for viewing an input source through an input optical device such as a telescope or camera lens or other input optical device. The system includes a housing having an input thread coupling adapted to be coupled to the input optical device, an image intensifier positioned within the housing for amplifying the input source, and a lens coupled to an output thread coupling of the housing for providing a virtual image of the input source viewable by the human eye.

In one example, the image intensifier has an input photocathode layer, an output phosphor screen, and a microchannel plate therein for improving the resolution of the image. The image intensifier can provide luminous gain on the order of 20,000 to at least 35,000. The lens coupled to an output thread coupling of the housing can be, for example, a multi-element lens such as an achromat pair.

In an alternate arrangement, the lens can be coupled to the output thread coupling of the housing using an adapter having one end adapted to be coupled to the housing, and another end adapted to be coupled to an image capturing device, such as a CCD video camera, CCD camera, film camera, digital camera, or other image capturing device. In this embodiment, the lens is selectively positionable along a portion of the length of the adapter, thereby varying the conjugate ratio so that a virtual image of selectably variable magnification is formed on the focal plane of the image capturing device.

In this manner, the present invention permits viewing the input source, optically intensified through the intensifier, as a virtual image through the lens using the human eye, or as a real image through the lens viewable through an image capturing device, depending on whether the lens is attached directly to the image intensifier or is attached to the image intensifier through the adapter.

The optical intensification system also has a battery compartment coupled to the housing for storing and electrically coupling a battery to a power supply input of the image intensifier. The battery compartment has a rotatable cap which is electrically connected in series with the battery and the power supply input of the image intensifier, so that the cap operates as an on/off switch when rotated.

A more complete appreciation of the present invention and its scope can be obtained from understanding the accompanying drawings, which are briefly summarized below, the following detailed description of the presently preferred embodiments of the invention, and the appended claims.

DETAILED DESCRIPTION OF THE PREFERRED EMBODIMENTS

The present invention provides image amplification and intensification with applicability for low brightness astronomical objects. The invention includes a primary amplifier assembly having an image intensifier within a housing, an input adapter, an output adapter, and output optics. Various embodiments of the input adapter and output adapters are disclosed herein for various optical applications.

Figure 1:
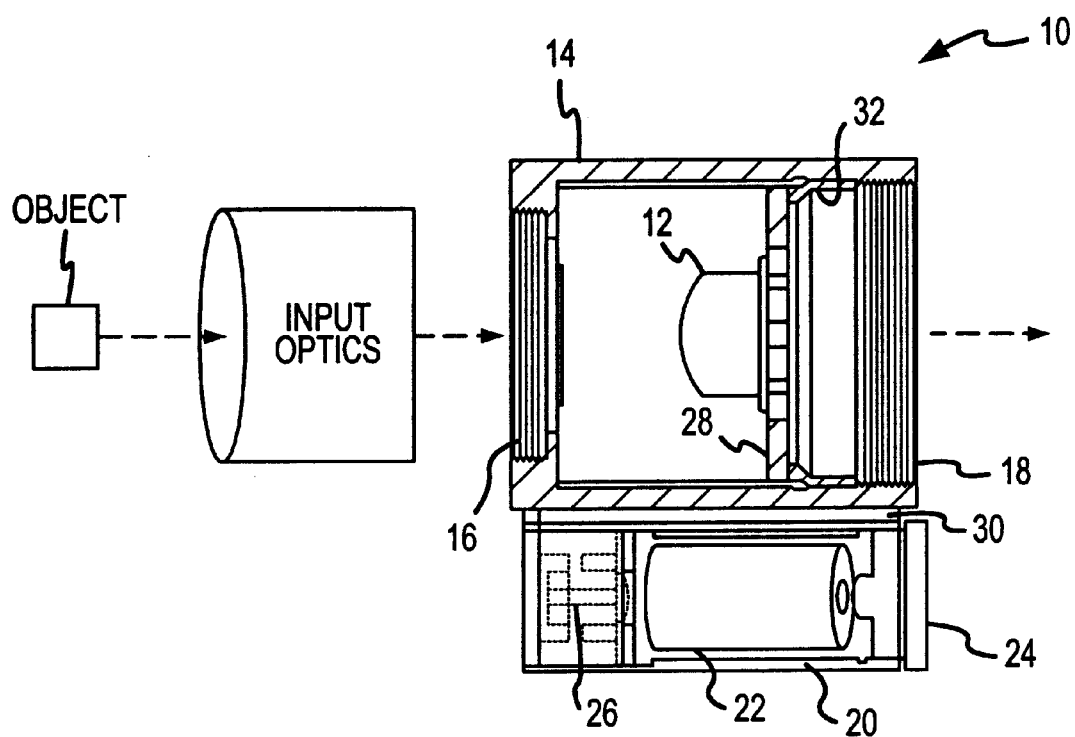
FIG. 1 illustrates a primary amplifier assembly in accordance with the present invention.

FIG. 1 illustrates the primary amplifier assembly 10 in accordance with the primary invention. The primary amplifier assembly 10 includes an image intensifier 12 for providing image amplification, and a housing 14 thereabout. In one example, the image intensifier 12 can be a M 873 Generation III Image Intensifier, available from Litton Electron Devices, Tempe, Ariz., or from ITT Night Vision, Roanoke, Va. The image intensifier has a micro-channel plate therein having a plurality of pores of substantially uniform diameters and being substantially uniformly spaced. The micro-channel plate improves the resolution of the image intensifier. The image intensifier 12 provides a luminous gain of 20,000 to at least 35,000, with a typical resolution of 36 line pairs per millimeter in a particular example.

In one example, the image intensifier 12 has a photocathode layer bonded to a glass input window. After internally processing the image, the output image of the image intensifier is focused on a phosphor screen deposited on a fiber optic surface. The image intensifier provides a real image at its output for further optical processing. By utilizing an image intensifier, the present invention achieves a degree of versatility with the use of output optics as will be described below.

The housing 14 surrounds the image intensifier 12 to provide an accurate optical center line for coupling of input and output optical devices to the image intensifier. The housing has a front/input thread coupling and a rear/output thread coupling. As will be described below, the front thread coupling 16 can be adapted to couple to either a lens adapter or a telescope adapter in accordance with the present invention. The rear thread coupling 18 of the housing can be adapted to couple to output optics or an adapter, such as a C-mount adapter, in accordance with the present invention.

The primary amplifier assembly 10 further provides a battery power system for providing electrical power to the image intensifier. In one example, a battery compartment 20 is provided coupled to said housing 14 and for housing a battery 22 which supplies power to the image intensifier. In one example, a three-volt lithium battery is housed within the battery compartment. The battery compartment further includes a battery cap 24, electrically coupled in series with the battery, functioning as an on/off switch by closing a circuit formed when the cap is rotated to its fully closed position. A contact assembly 26 and contact plate 28 are also provided as a portion of the circuit to couple the battery voltage to the image intensifier. In this manner, when the battery 22 is inserted within the battery compartment and the cap 24 is secured in its fully-closed position, the image intensifier 12 is electrically activated. The user can then disable the image intensifier 12 by partially rotating the battery cap 24 until the image intensifier deactivates. A spacer adapter 30 is provided between the outside of the housing of the image intensifier and the battery compartment for electrically isolating the image intensifier from the housing. It is understood that other means for activating and deactivating the battery power applied to the image intensifier, such as switches or push buttons, may be used depending upon the particular implementation chosen.

A retaining ring 32 is provided to securely maintain the image intensifier 12 within the housing 14 at a fixed position and alignment. The image intensifier, in one embodiment of the invention, is oriented such that the distance between the input image, as governed by the front thread coupling 16, focuses upon the photocathode layer of the input window of the image intensifier. The output phosphor screen of the image intensifier is also oriented at a fixed location from the rear thread coupling 18. Hence, the retaining ring 32 establishes fixed focal distances for the input and output sections of the image intensifier 12. It has been found that the input focal distance can be approximately 0.25 inches from the front input window of the image intensifier. The distance from the output of the image intensifier to the output optics is a matter of choice depending upon the nature of the output optics utilized.

Figure 2:
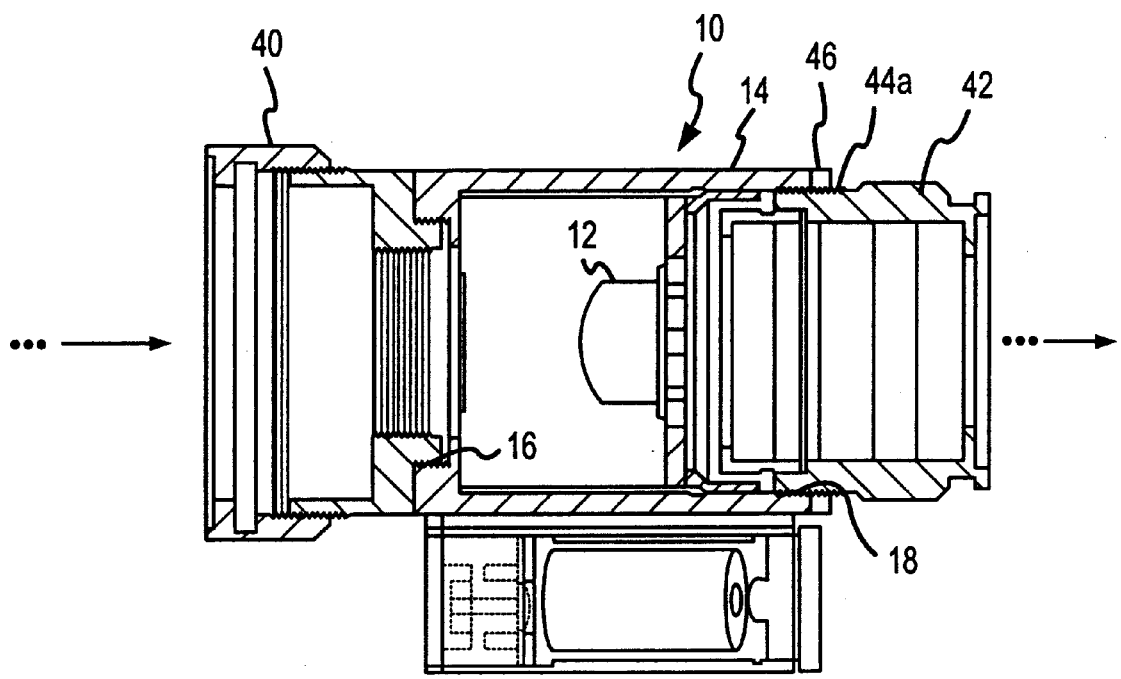
FIG. 2 illustrates the primary amplifier assembly of FIG. 1 with a lens adapter and a lens coupled thereto for providing an amplified virtual image in accordance with the present invention.

FIG. 2 illustrates the primary amplifier assembly 10 of the present invention, a lens adapter 40 coupled to the front thread couplings 16, and a lens 42 coupled to the rear thread couplings 18. The lens adapter 40 allows the primary amplifier assembly 10 to be coupled to any standard camera lens (i.e., 35 mm lens by Nikon, Canon, etc.) so that the focused image from the camera lens can be optically coupled to the input window of the image intensifier. In this manner, the primary amplifier assembly 10 can be coupled to a conventional camera lens to provide a low cost, high-luminous gain telescope.

In accordance with the present invention, the lens 42 shown in FIG. 2 optically couples the image intensifier output with either the eye (in the case of a virtual image) or an image capturing device such as a CCD video camera (in the case of a real image), as will be explained below. Lens 42 can be, for example, a multi-element lens or compound lens assembly or the like, such as an achromat pair or an air-spaced lens pair.

Since the output phosphor screen of the image intensifier 12 has a spherical radius at its output surface, the output image from the image intensifier may be subject to spherical distortion. However, due to its radius of curvature, the lens 42 utilized by the present invention minimizes spherical distortion of the image from the image intensifier. The lens 42 further minimizes chromatic aberration or distortion of the image provided by the image intensifier.

Figure 3:
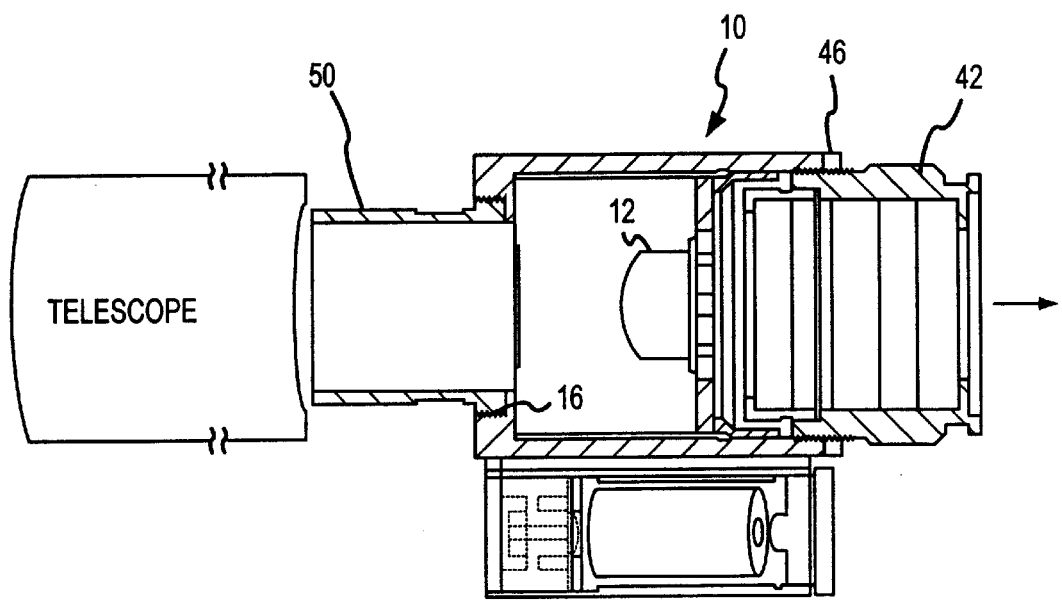
FIG. 3 illustrates the primary amplifier assembly of FIG. 1 with a telescope adapter and a lens coupled thereto for providing an amplified virtual image in accordance with the present invention.

FIG. 3 illustrates an embodiment of the present invention utilizing a telescope adapter 50 coupled to the input thread coupling 16 of the primary amplifier assembly 10. The telescope adapter 50 can be, for example, an adapter for the typical 1.25 inch female mounting found on commonly available telescopes. In this manner, the present invention can be attached to a conventional telescope and the user can view the intensified images through the output end of the lens. While the adapter shown in FIG. 3 has been described as a 1.25 inch telescope adapter, it is understood that other adapter dimensions can be used depending on the particular implementation (i.e., a 2 inch adapter, a 0.965 inch adapter, etc.). As discussed above, the input thread coupling 16 of the housing 14 can be coupled either to a telescope or a camera lens or other input optical device depending on which adapter 50 is used.

The lens 42 can provide either a virtual image or a real image at its output depending upon the location of the lens relative to the output image of the image intensifier, as will be discussed below. In both FIG. 2 and FIG. 3, the output image provided by the lens is a virtual image intended for viewing directly by a person's eye.

Figure 4:
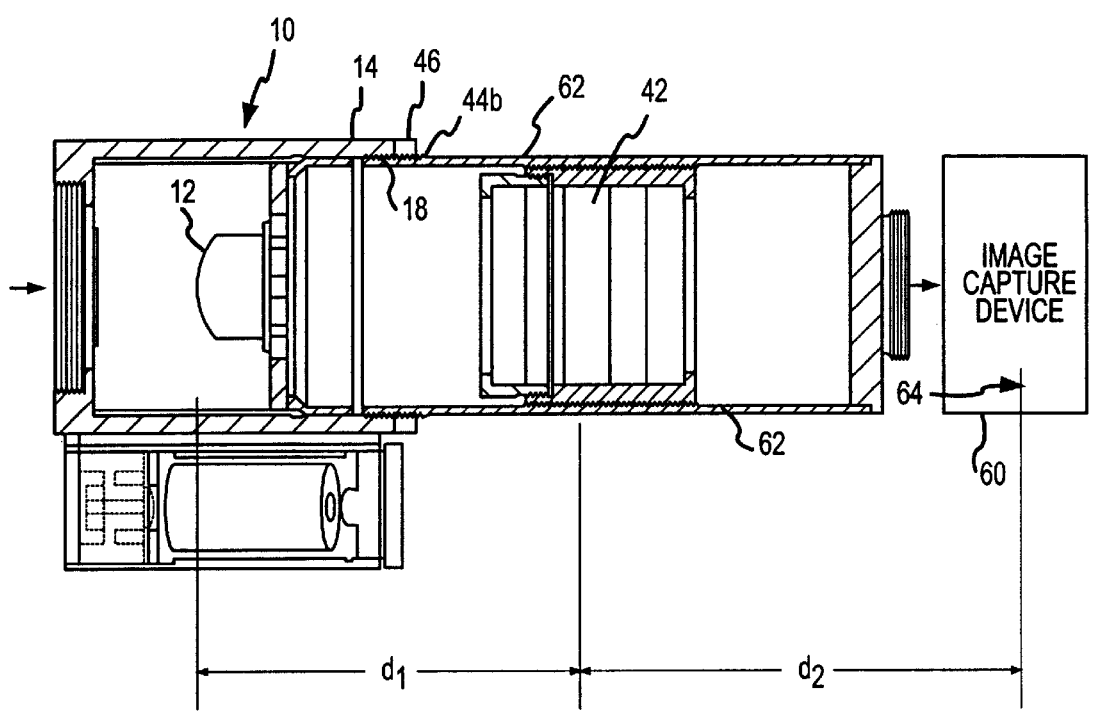
FIG. 4 illustrates the primary amplifier assembly with a lens coupled thereto using an adapter for providing an amplified real image in accordance with the present invention.

FIG. 4 illustrates one embodiment of the present invention where a real image is produced by the lens 42 so that this real image can be manipulated by devices 60 capable of accepting real images, such as conventional film cameras or charge couple device (CCD) video cameras, or other image capturing devices. In the embodiment shown in FIG. 4, an adapter 62, such as a C-mount adapter, is coupled to the rear thread couplings 18 of the primary amplifier assembly 10 so that a real image is created by manipulating focal lengths. The C-mount adapter 62 is used to position the lens 42 at a first distance (d1) greater than one times the focal length (1f) of the lens from the image created by the image intensifier 12. The desired output focal length is spaced a second distance (d2) greater than one focal length (1f) of the lens as measured from the rear focal plane of the lens. In this manner, a real image is formed on the film or focal plane 64 of the image capturing device 60. It is understood that the C-mount adapter shown in FIG. 4 could be replaced with adapters having varying conjugate ratios to provide more or less magnification of the image from the intensifier to the capturing device. Hence, the adapter is a matter of choice dependent upon the particular implementation chosen. For example, when the capturing device is a CCD video camera, the C-mount adapter provides a spacing specifically adapted for CCD video cameras (i.e., 17.5 mm from the output end of the C-mount adapter to the focus plane of the CCD video camera).

As shown in FIG. 4, the primary amplifier assembly 10, having the image intensifier therein 12, provides an amplified and intensified real image which can be photographed or captured using conventional film, electro/optical equipment, or capturing devices 60 such as CCD cameras or digital cameras without excessively long exposure times.

Figure 5:
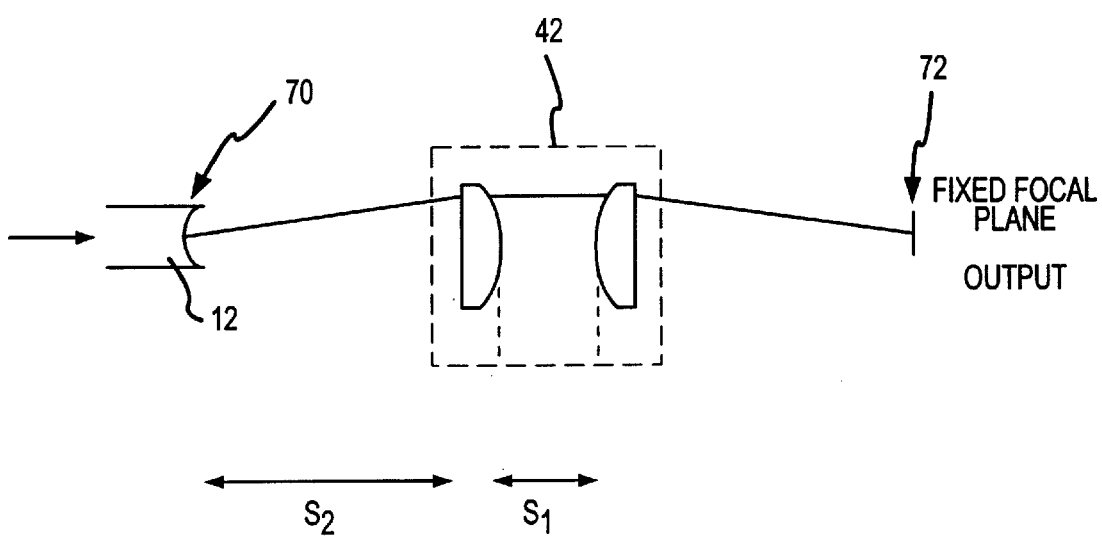
FIG. 5 illustrates the dimensions which can be altered to adjust the magnification ratios between the image intensifier output and a fixed focal plane in accordance with the present invention.

With respect to the lens 42 and in accordance with the present invention, variable magnification ratios can be controllably provided at the output of the lens 42. As shown in FIG. 5, the magnification ratios can be varied by varying the spacing (s1) between the lens elements. The magnification ratio can also be varied by varying the conjugate ratio between the output 70 of the image intensifier and the focal plane output 72 of the lens 42. The conjugate ratio is the relationship of the length (d1) to (d2) shown in FIG. 4. The conjugate ratio can be varied by adjusting the distance of the lens from the image intensifier 12. Rotatable knob controls (not shown) coupled to the lens can be provided so that the user can manually adjust these magnification ratios. In one example, a first knob controls the separation (s1) between the lens elements, while a second knob controls the distance (s2) between the image intensifier 12 and the first element. As (s1) increases, magnification increases. As (s2) decreases, magnification increases.

Referring to FIG. 2 and FIG. 4, the manner in which the lens 42 or the adapter 62 is secured to the housing 14 of the primary amplifier assembly 10 of the present invention will now be described. As previously mentioned, the housing 14 has rear thread coupling 18 internal to the housing. Both lens 42 and C-mount adapter 62 are provided with external threading 44a, 44b respectively adapted to mate within rear thread coupling 18. The component 42 or 62 is screwed into position within housing 14 until a desired focal length is established between the image intensifier 12 and the component 42 or 62.

A locking ring 46 can then be placed about external threading 44a, 44b and screwed into abutment with the housing 14 to prevent further axial movement or rotation of component 42 or 62 relative to housing 14 and to act as a positional guide or a stop. In this manner, once an individual component 42 or 62 has been coupled to housing 14 and a focal length established and the locking ring 46 secured, the component can be removed with the locking ring 46 acting as a guide to assist the user in reestablishing the same focal length when the component is again attached to the housing. Hence, the locking ring 46 permits rapid interchanges between components coupled to the housing 14. A second locking ring can further be provided about external threading 44a, 44b to abut against locking ring 46 to better maintain the positional stop established by locking ring 46.

While the invention has been particularly shown and described with reference to a preferred embodiment thereof, it will be understood by those skilled in the art that various other changes in the form and details may be made without departing from the spirit and scope of the invention.

What is claimed is:

1. An optical intensification system for viewing an input source through a lens as a virtual image or as a real image, comprising:

an image intensifier for amplifying the input source and producing an amplified image; and a housing containing the image intensifier, the housing having a rear thread coupling selectively configurable to couple the lens directly to said housing or to couple the lens to said housing through an adapter, so that the amplified image is a virtual image when the lens is coupled directly to said housing and the amplified image is a real image of selectively adjustable magnification when the lens is coupled to the housing through the adapter.

2. The optical intensification system of claim 1, wherein when said lens is coupled directly to said housing, the virtual image is viewable by a human eye.

3. The optical intensification system of claim 1, wherein when said lens is coupled to said housing through the adapter, the real image is viewable through an image capturing device.

4. The optical intensification system of claim 1, wherein the lens is a multi-element lens.

5. The optical intensification system of claim 1, wherein the multi-element lens is an achromat pair.

* * * * *